United States Patent
Torrey et al.

(10) Patent No.: US 6,864,658 B1
(45) Date of Patent: Mar. 8, 2005

(54) CLOSED LOOP CONTROL OF EXCITATION PARAMETERS FOR SWITCH-RELUCTANCE MOTORS

(75) Inventors: David A. Torrey, Ballston Spa, NY (US); Yilmaz Sozer, Troy, NY (US)

(73) Assignee: Advanced Energy Conversion, LLC, Ballston Spa, NY (US)

( * ) Notice: Subject to any disclaimer, the term of this patent is extended or adjusted under 35 U.S.C. 154(b) by 0 days.

(21) Appl. No.: 10/678,890

(22) Filed: Oct. 3, 2003

(51) Int. Cl.[7] .............................. H02P 7/05; H02P 6/18
(52) U.S. Cl. .................... 318/701; 318/254; 318/439
(58) Field of Search ............................ 318/138, 254, 318/439, 700, 701, 721

(56) References Cited

U.S. PATENT DOCUMENTS

| | | | |
|---|---|---|---|
| 4,933,620 A | 6/1990 | MacMinn et al. | |
| 5,168,202 A | 12/1992 | Bradshaw et al. | |
| 5,838,133 A * | 11/1998 | McCann | 318/701 |
| 5,841,262 A * | 11/1998 | Tang | 318/701 |
| 5,864,218 A | 1/1999 | Orthmann | |
| 5,977,740 A | 11/1999 | McCann | |
| 6,011,377 A * | 1/2000 | Heglund et al. | 318/701 |
| 6,040,678 A * | 3/2000 | Huh et al. | 318/701 |
| 6,046,561 A | 4/2000 | Zup et al. | |
| 6,359,414 B1 * | 3/2002 | Nickel | 318/701 |
| 6,788,021 B2 * | 9/2004 | Sozer et al. | 318/701 |

* cited by examiner

*Primary Examiner*—Bentsu Ro
(74) *Attorney, Agent, or Firm*—Michael F. Hoffman; Hoffman, Warnick & D'Alessandro LLC

(57) ABSTRACT

A system and method for controlling the turn-on and turn-off angles of a switch reluctance motor. A control system is provided that comprises: a turn-on controller that includes a first component for controlling a turn-on angle during low speed operations and a second component for controlling the turn-on angle during high speed operations such that transitions between low speed and high speed occur naturally; and a turn-off controller having an algorithm for controlling a turn-off angle, wherein the algorithm calculates the turn-off angle as a function of rotor speed, reference peak phase current, and a set of curve fit parameters.

26 Claims, 13 Drawing Sheets

TABLE 1: THE SPECIFICATIONS FOR THE EXPERIMENTAL SRM.

| QUANTITY | VALUE | UNITS |
|---|---|---|
| RATED POWER | 1000 | W |
| BASE SPEED | 1500 | rpm |
| MAXIMUM SPEED | 3,000 | rpm |
| Dc VOLTAGE | 12 | V |
| NUMBER OF ROTOR POLES | 12 | |
| NUMBER OF STATOR POLES | 16 | |
| NUMBER OF PHASES | 4 | |
| ALIGNED PHASE INDUCTANCE | 0.228 | mH |
| UNALIGNED PHASE INDUCTANCE | 0.0226 | mH |
| $\theta_g$ | 142 | ° (ELECTRICAL) |
| $\theta_m$ | 218 | ° (ELECTRICAL) |

TABLE 2: THE PARAMETERS FOR THE CONTROLLERS OF FIGS. 6.

| QUANTITY | VALUE | UNITS |
|---|---|---|
| $K_{p\theta}$ | 0.033 | |
| $K_{pI}$ | 1.899 | ° / A (ELECTRICAL) |
| $\theta_{cond}$ | 178 | ° (ELECTRICAL) |
| $\kappa_1$ | -8.106e-5 | °s / A (ELECTRICAL) |
| $\kappa_2$ | -1.397e-2 | °s (ELECTRICAL) |
| $\kappa_3$ | -9.278e-1 | ° / √A (ELECTRICAL) |
| $\kappa_4$ | 3.556e2 | ° (ELECTRICAL) |
| PROPORTIONAL GAIN | 0 | |
| INTEGRAL GAIN | 78 | $s^{-1}$ |

*FIG. 8*

CLOSED LOOP CONTROL OF EXCITATION PARAMETERS FOR SWITCH-RELUCTANCE MOTORS

BACKGROUND OF THE INVENTION

1. Technical Field

The present invention relates generally to switch-reluctance motors (SRM's), and more specifically relates to a system and method of controlling the turn-on and turn-off angles of an SRM.

2. Related Art

Electric machines can be broadly classified into two categories on the basis of how they produce torque—electromagnetically or by variable reluctance. In the first category, motion is produced by the interaction of two magnetic fields, one generated by the stator and the other by the rotor. Two magnetic fields, mutually coupled, produce an electromagnetic torque tending to bring the fields into alignment. The same phenomenon causes opposite poles of bar magnets to attract and like poles to repel. The vast majority of motors in commercial use today operate on this principle.

In the second category, motion is produced as a result of the variable reluctance in the air gap between the rotor and the stator. When a stator winding is energized, producing a single magnetic field, reluctance torque is produced by the tendency of the rotor to move to its minimum reluctance position. As far as motors that operate on this principle, the switched-reluctance motor (SRM) falls into this class of machines.

The switched-reluctance motor (SRM) is under development for variable speed applications where the inherent characteristics of the SRM make commercial sense. To date, these applications include, e.g., sourcing aerospace power systems, starter/alternators for hybrid vehicles, and wind turbine applications. The aerospace and automotive applications are generally characterized by high-speed operation. The wind energy application is characterized by low speed, high torque operation.

The SRM produces torque through excitation that is synchronized to rotor position. The excitation is generally described by three excitation parameters: the turn-on angle θon, the turn-off angle θoff, and the reference current Iref. The turn-on angle θon refers to the rotor position where phase excitation (current) is initiated. The turn-off angle θoff refers to the rotor position where phase excitation is ended. The reference current Iref is the desired phase current during phase excitation. It should be noted that current continues to flow in the phase winding after θoff, but the phase current is monotonically decreasing by virtue of the state of the inverter switches. A computerized controller is typically utilized to control the parameters. Control of the excitation angles results in either positive net torque for motoring, or negative net torque for generating. A major challenge for implementing an SRM involves implementing a controller that effectively selects the turn-on and turn-off angles. Unfortunately, prior solutions have failed to provide a solution that allows for efficient operation of the SRM that is easily implemented. Such inefficiencies have lead to larger sizes, increased weight, and increased energy consumption.

Prior art examples include U.S. Pat. No. 4,933,620, issued to MacMinn et al., which is hereby incorporated by reference and discloses a control strategy for low speed operation of an SRM. The invention deals with closed loop control of the turn-on angle of the SRM at low speeds and its hardware implementation. The suggested method tries to adjust the turn-on angle with the closed loop control such that first peak of the phase current occurs at the desired position. This control breaks down at the elevated speeds where the turn-on angle has no effect on the place of the first peak of the phase currents. The invention also keeps the conduction angle constant and advances the turn-off angle as the turn-on angle advances, but the conduction angle also needs to be adjusted as the operating conditions change for efficient system operation.

U.S. Pat. No. 6,046,561 issued to Zup et al., which is hereby incorporated by reference, discloses a commutation control method for the SRM. The invention focuses on a hardware implementation of an approach commonly known as "phase advance" with a low cost position encoder. Phase advance means that the phase conduction interval is shifted relative to the angular interval over which the phase inductance is increasing. In U.S. Pat. No. 6,046,561, the phase advancement is made using only speed information and the conduction angle is kept constant in the invention. This assumption causes deterioration in the SRM efficiency. The most efficient turn-on and turn-off angles are nonlinear functions of the motor speed and motor phase currents and subject to change also with operating parameters.

Unfortunately, none of the prior art provides efficient control of the excitation angles of the SRM at all operating points without extensive machine modeling and simulation. Accordingly, a need exists for a controller that can achieve these goals with a simple and efficient implementation.

SUMMARY OF THE INVENTION

The present invention addresses the above-mentioned problems, as well as others, by providing an SRM controller that provides an integrated solution for the selection of the turn-on and turn-off angles for an SRM in order to get the most efficient operation over the entire operating region. The turn-on angle is driven by closed loop control, in which the controller automatically adjusts the turn-on angle by using the place of first peak of the phase current and its magnitude. The turn-off angle is determined based on experimental characterization at a limited number of operating points. The method does not need machine modeling or extensive simulations. Because the operating points can be characterized experimentally, it is not necessary to characterize them analytically. The algorithm is easy to implement and does not need look up tables for excitation parameters.

In a first aspect, the invention provides a controller for a switched-reluctance motor (SRM), comprising: a turn-on controller that includes a first component for controlling a turn-on angle during low speed operations and a second component for controlling the turn-on angle during high speed operations such that the two components automatically exchange control responsibility based on operating conditions; and a turn-off controller having an algorithm for controlling a turn-off angle, wherein the algorithm calculates the turn-off angle as a function of rotor speed, reference peak phase current, and a set of curve fit parameters.

In a second aspect, the invention provides a system for controlling a turn-off angle for a switched-reluctance motor (SRM), comprising an algorithm that calculates the turn-off angle as a function of rotor speed, reference peak phase current, and a set of curve fit parameters.

In a third aspect, the invention provides a program product stored on a recordable medium for controlling a switched-reluctance motor (SRM), the program product comprising: means for controlling a turn-on angle during low speed operations; means for controlling the turn-on angle during high speed operations; and means for controlling a turn-off angle, wherein said means includes an algorithm that calculates the turn-off angle as a function of rotor speed, reference peak phase current, and a set of curve fit parameters.

In a fourth aspect, the invention provides a switched-reluctance motor (SRM), comprising: a first system for controlling a turn-on angle when the SRM operates below a base speed, wherein said first system causes a rotor angle position associated with a first peak of the phase current to equal the rotor angle position where an inductance begins to increase; a second system for controlling the turn-on angle when the SRM operates above a base speed, wherein said second system causes the turn-on angle to be advanced until the peak current equals a reference current; and a third system for controlling a turn-off angle, wherein said third system includes an algorithm that calculates the turn-off angle as a function of rotor speed, reference peak phase current, and a set of pre-calculated curve fit parameters. An important feature of the invention is the interaction between the first two systems as the operating point is commanded to change. That is, the first system may override the actions of the second system, or vice-versa, as the operating point (motor loading or speed) is changed.

In a fifth aspect, the invention provides a method for controlling a turn-off angle for a switched-reluctance motor (SRM), comprising the steps of: obtaining a reference current value from a speed controller of the SRM; obtaining a rotor speed of the SRM; and calculating the turn-off angle as a function of rotor speed, reference peak phase current, and a set of pre-calculated curve fit parameters.

BRIEF DESCRIPTION OF THE DRAWINGS

FIG. 8 depicts controller specifications and parameters in accordance with present invention.

DETAILED DESCRIPTION OF THE INVENTION

1. Overview

Figure 1:
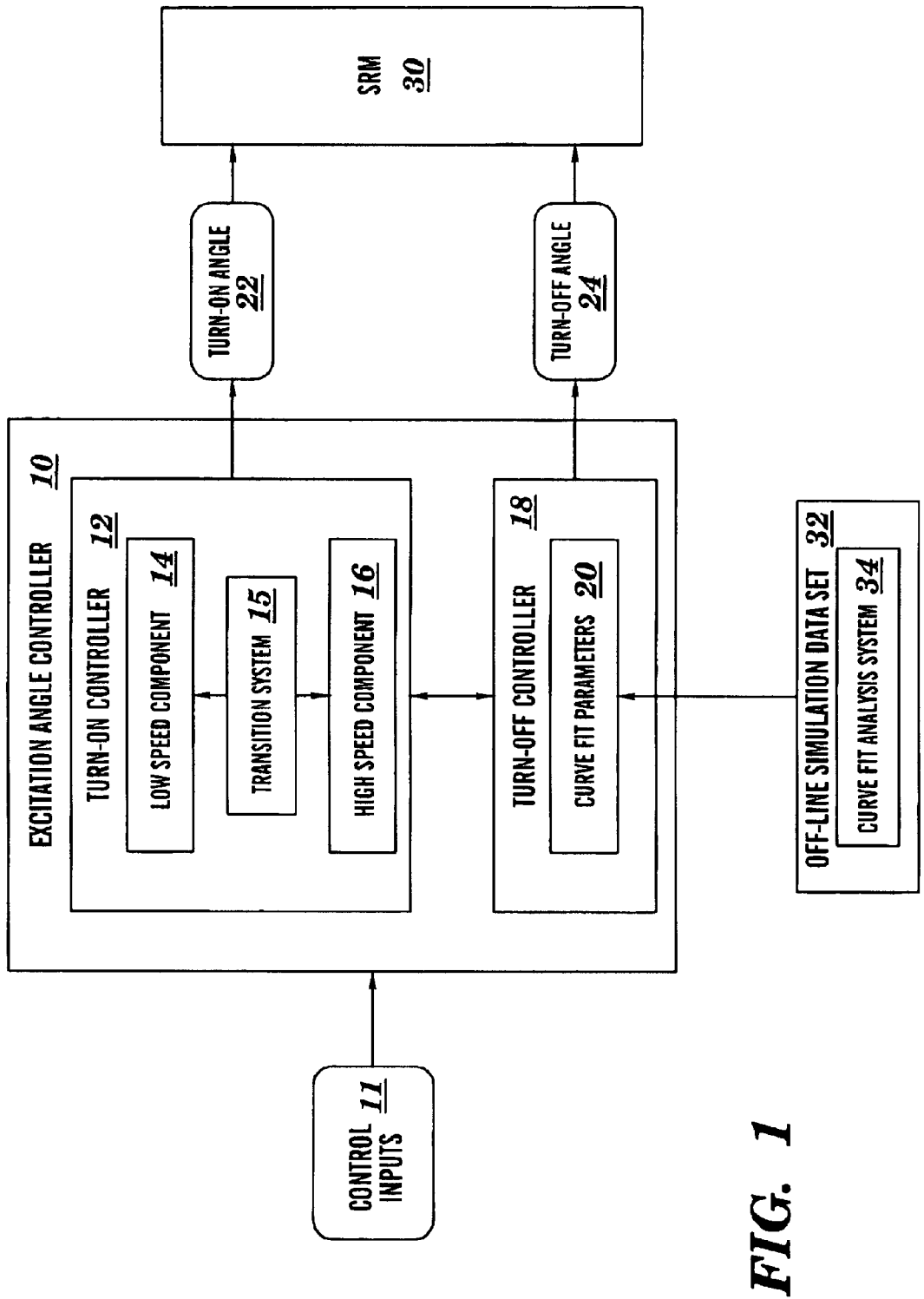
FIG. 1 depicts a system depicts an excitation angle controller in accordance with present invention.

Referring to the drawings, FIG. 1 depicts a switched-reluctance motor (SRM) excitation angle controller 10 that provides for the automatic control of the excitation parameters for SRM 30. Specifically, SRM excitation angle controller 10 determines the turn-on 22 and turn-off angles 24, which are the two main factors used to control the amount and efficiency of the electromechanical energy conversion process. SRM excitation angle controller 10 includes a turn-on controller 12 and a turn-off controller 18, which are integrated together to provide the most efficient operation of the motor drive system. The turn-on and turn-off controllers 12, 18 work independently and harmoniously with the speed controller (shown in detail below in FIG. 7). SRM excitation angle controller 10 receives various control inputs 11, including, commanded peak phase current, actual rotor speed, actual phase current, and rotor position. The number and type of the system control inputs may vary somewhat by application, depending on the function of the motor system and how the excitation angle controller 10 is integrated into the overall system controller.

The turn-on controller 12 includes a low speed component 14 that is generally active at low speeds when the phase currents are regulated through inverter switching operations. The turn-on controller 12 also includes a high speed component 16 that is generally active at high speeds when the phase currents are voltage regulated. A transistion system 15 is provided that allows the two components 14, 16 to automatically exchange control responsibility based on operating conditions, namely rotor speed and torque. The two components of the turn-on controller 12 interact such that the value of Iref is respected and the first occurrence of the peak current Ip occurs at θm. This is particularly valuable as the operating point of the motor is changed. The rotational speed and the torque load on the shaft specify the operating point of the motor. The operating point could change because the speed setpoint is changed creating a speed error input to the speed controller (54 in FIG. 7) or because the mechanical load on the motor shaft changes. It will be appreciated that the speed at which the transition takes place between current regulated operation and voltage regulated operation is a function of motor load. The low speed component 14 that controls the turn-on angle when the SRM 30 is running at a speed below a critical operating point, and the high speed component 16 that controls the turn-on angle 22 when the SRM 30 is running at a speed above the critical operating point automatically work together to resolve the correct turn-on angle such that the first peak in phase current occurs at θm. Turn-off controller 18 determines the turn-off angle 24 based on rotor speed, a reference peak phase current and a set of pre-calculated curve fit parameters 20.

The low speed component 14 of the turn-on controller 12 monitors the position of the first peak of the phase current θp and seeks to align this position with the angle where the inductance begins to increase θm. The high speed component 16 of the turn-on controller 12 monitors the peak phase current and advances the turn-on angle 22 if the controller cannot produce the commanded reference current. The commanded phase current takes on different meanings depending on the operating speed. At low speeds, the commanded phase current is taken to be the nominally constant current that flows through the phase winding while the phase is excited. At low speeds it is possible to supply the phases with current that approximates a square pulse. As the rotor speed increases, it becomes increasingly difficult to maintain constant phase current. In this case, the commanded phase current becomes the commanded peak phase current. The transition between these two interpretations depends on both rotor speed and motor torque. The transition is seamless within the controller because it focuses on the rotor position at which the first peak in phase current occurs.

Figure 11:
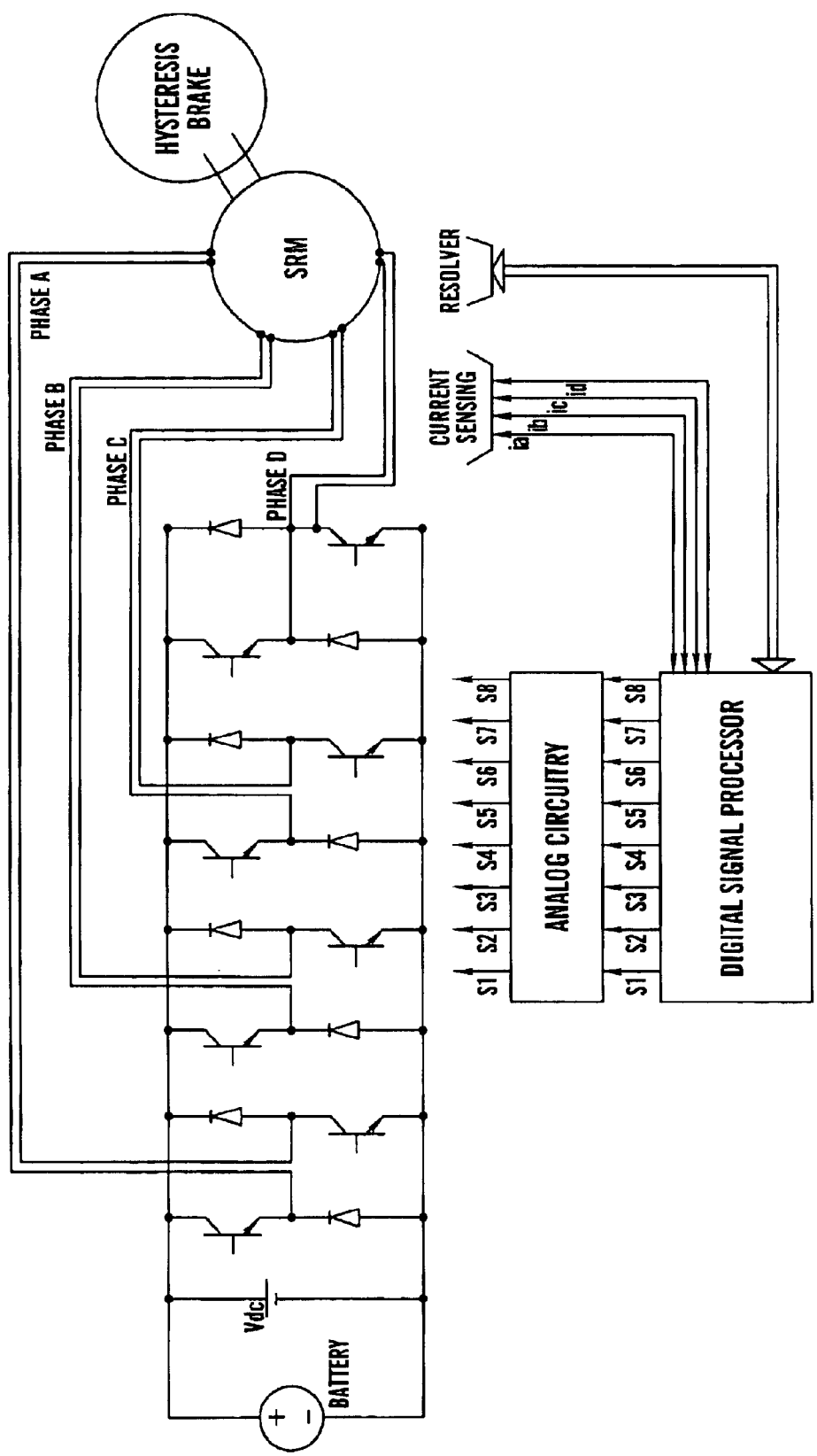
FIG. 11 shows a block diagram of an experimental setup.

The low speed component 14 of the turn-on controller 12 tends to be active below the base speed of the SRM 30, where phase currents can be built easily by an inverter and θp is relatively independent of θm. The inverter is a power electronic converter that is responsible for exciting the phase windings of the SRM. In a normal implementation, semiconductor switches are commanded to direct energy into and out of the SRM phase windings. The commands for turning these semiconductor switches on and off are the turn-on angle 22 and the turn-off angle 24. The standard inverter for a four phase SRM is shown in FIG. 11. It will be appreciated that the control methodology disclosed herein is applicable to other SRM inverter topologies. The high speed component 16 of the turn-on controller 12 is active above base speed, where the peak of the phase currents tends to naturally occur at θm regardless of the current amplitude. The two components 14, 16 of the turn-on controller 12 naturally exchange responsibility as a result of a change in command or operating point. This ability for the low speed and high speed components of the turn-on angle controller 12 to work harmoniously through operating point changes is an important feature of the invention.

The turn-off controller 18 works independently of the turn-on controller 12. In particular, the turn-off angle 24 is calculated based on rotor speed, reference peak phase current (i.e., reference current), and a set of pre-calculated curve fit parameters 20. The curve fit parameters 20 are calculated off-line from a simulation data set 32 using a curve fit modeling system 34. Using modeling of an experimental SRM and extensive simulation, it can be seen that the optimal-efficiency turn-off angles can be characterized as a function of peak phase current (i.e., reference current) and rotor speed. The optimal efficiency turn-off angle 24 is thus provided by curve fit modeling system 34 based on the calculated set of curve fit parameters 20. Based on experimental analysis, it is shown that a curve fit using only four optimized points introduces acceptably low error for the most efficient turn-off angle 24 at any given operating point. It will be appreciated that the data used to determine the four curve fit parameters can be obtained experimentally or through simulation.

Figure 2:
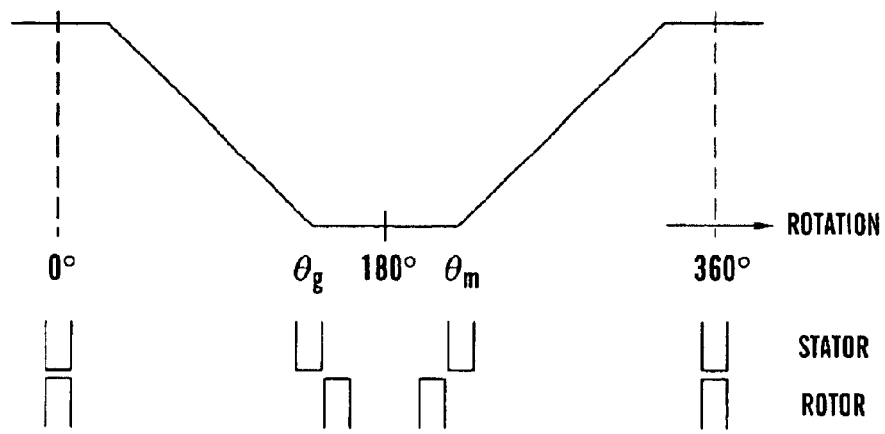
FIG. 2 depicts a linear inductance profile of an SRM in accordance with present invention.

The objectives of the controller 10 are further explained through consideration of the linear inductance profile for the SRM 30 shown in FIG. 2. The minimum inductance region is defined by the angular interval over which the rotor poles do not overlap the stator poles. The maximum inductance region is defined by the angular interval over which there is complete overlap between the stator and rotor poles. The regions of increasing and decreasing inductance correspond to varying overlap between the stator and rotor poles.

For operation of the SRM 30 as a motor, phase current must be present in the phase winding as the inductance is increasing in the direction of rotation. For operation of the SRM 30 as a generator, phase current must be present in the phase winding as the inductance is decreasing in the direction of rotation. The polarity of current is immaterial, so it is assumed that the phase current is always positive. The turn-on angle 22 is the electrical position where the turn-on controller 12 starts exciting the motor phase. The turnoff angle 24 is the electrical angle where the turn-off controller 18 causes the phase current to be forced to zero and to remain at zero for the remainder of that cycle. The placement of the excitation angles is extremely important in producing the amount of the torque efficiently at any operating point. As long as continuous conduction is prevented during one electrical cycle, turn-on and turnoff angles can be controlled separately.

2. Turn-on Controller

If one were to examine the static torque curve for a typical SRM, it would be observed that the maximum torque for a given amount of current occurs as the rotor begins to move out of the minimum inductance position. This observation suggests that maximum torque per Ampere is produced upon leaving the minimum inductance position. Iron permeance causes torque production to fall off as overlap between the stator and rotor poles increases. In applications where average torque is of primary importance, it is important to make the most of the region near the unaligned position. Because it takes time to build the phase currents, the arrival of the torque production region must be anticipated. The turn-on controller 12 must, therefore, turn on the phase windings before the angle marked θm shown in FIG. 2 so that the current is at Iref when the rotor reaches θm. The conventional approach to determining θon is to work backward from θm, as follows:

$$\theta on = \theta m - \frac{Lmin Iref \omega}{Vdc} \quad (1)$$

where Lmin is the minimum inductance, Vdc is the dc bus voltage, ω is the rotor speed, and Iref is the chopping level. Eq. (1) assumes the inductance is constant during the region [θg, θm].

The inductance, however, is a function of the phase current and rotor position. At low speed this method can give reasonable performance. For operation over a wide speed range, Eq. (1) starts to break down as the turn-on angle 22 is pushed to occur before the start of the minimum inductance position (θg in FIG. 2). Accordingly, the present invention provides closed loop control that adjusts the turn-on angle 22 to force the first peak of the phase current to occur at θm without the need of accurate motor parameters and measurement of the dc bus voltage.

Figure 3:
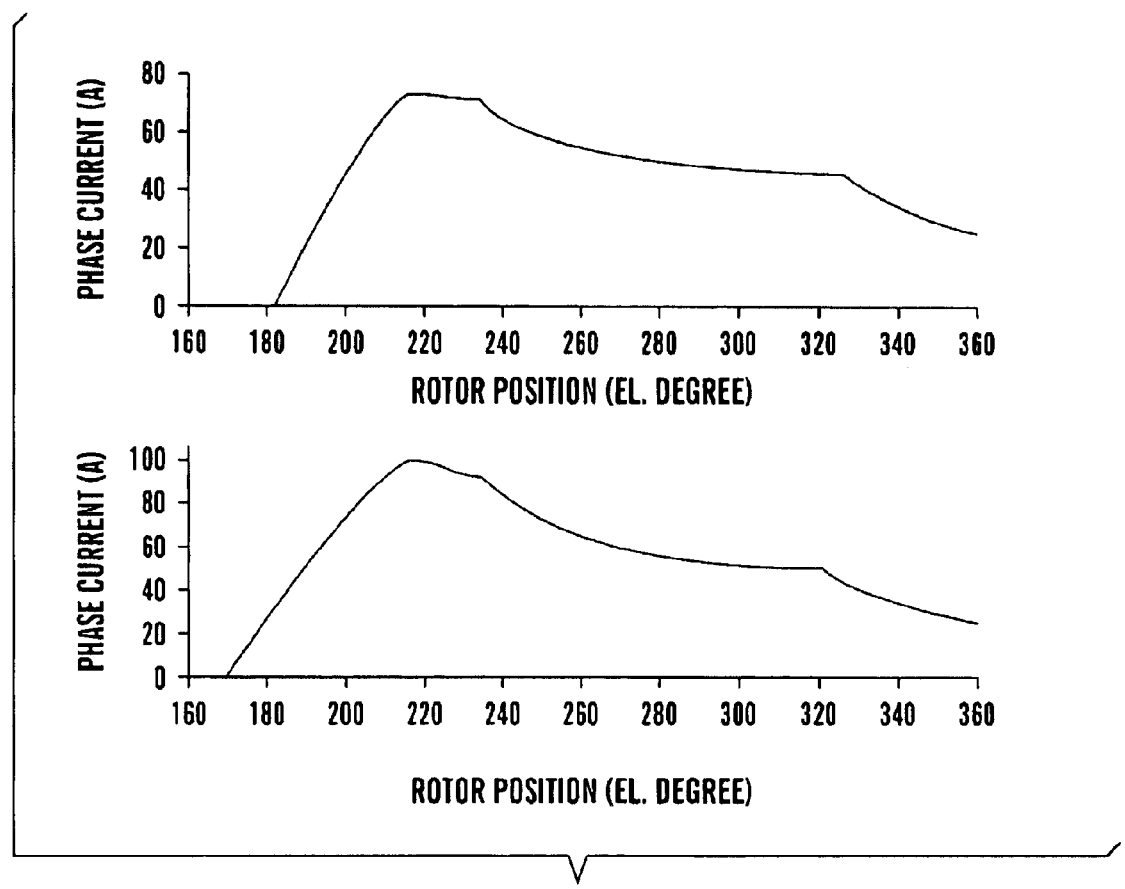
FIG. 3 depicts phase graphs of an SRM in accordance with present invention.

The proposed closed loop control system of the turn-on controller 12 continuously monitors the position of the first peak of the phase current (θp). The turn-on angle is advanced or retarded automatically according to the error between θp and θm. This piece of the controller successfully places θp at θm. Above base speed, the peak current naturally tends to occur near θm. At these speeds, the turn on angle θon has little impact on the phase current θp, but has significant impact on the magnitude of the current at θp. This phenomenon can be observed from FIG. 3, where an SRM is simulated at 2500 rpm with two different turn-on angles. For each of the turn-on angles, θp occurs approximately at the same place with different current magnitudes. To reflect this, the turn-on controller 12 forces the peak phase current to match the commanded phase current. Feedforward control of θon using Eq. (1) is used to speed convergence to the correct value of θon.

If the turn-on controller 12 is in current regulation mode, Ip occurs close to Iref so the error between Ip and Iref does not have any effect on the command for θon. Current regulation mode occurs where the SRM is operating a sufficiently low speed that active regulation of the phase currents is required to keep the phase currents from growing without bound. Typically current regulation is required below the base speed of the SRM, though it will be appreciated that the speed at which current regulation is no longer required is a function of SRM loading. Below base speed, the piece of the turn-on controller 12 responsible for keeping θp at θm effectively works to achieve the control objective. At high speed, if the controller 12 is in voltage control mode, θp naturally occurs at θm. Voltage control mode refers to the operating condition where the phase currents cannot be controlled to be nominally constant, even with continued application of the full input dc voltage. The piece of the turn-on controller 12 responsible for forcing Ip to track Iref effectively works to advance the turn-on angle 22 to keep Ip close to Iref. If the reference current or the motor speed is reduced, the drive enters into current regulation mode and θp occurs before θm, the piece of the controller responsible for forcing θp=θm becomes active and brings θp to θm by retarding θon.

3. Turn-off Controller

Once the phase current after turning on the phase excitation has been established, the turn-off controller 18 is required to turn off the excitation at the optimum position to produce the maximum amount of torque with a minimum electrical input for a given peak phase current. From the turn-on controller 18, the optimum turn-on angle 22 for the operating point is established.

Figure 4:
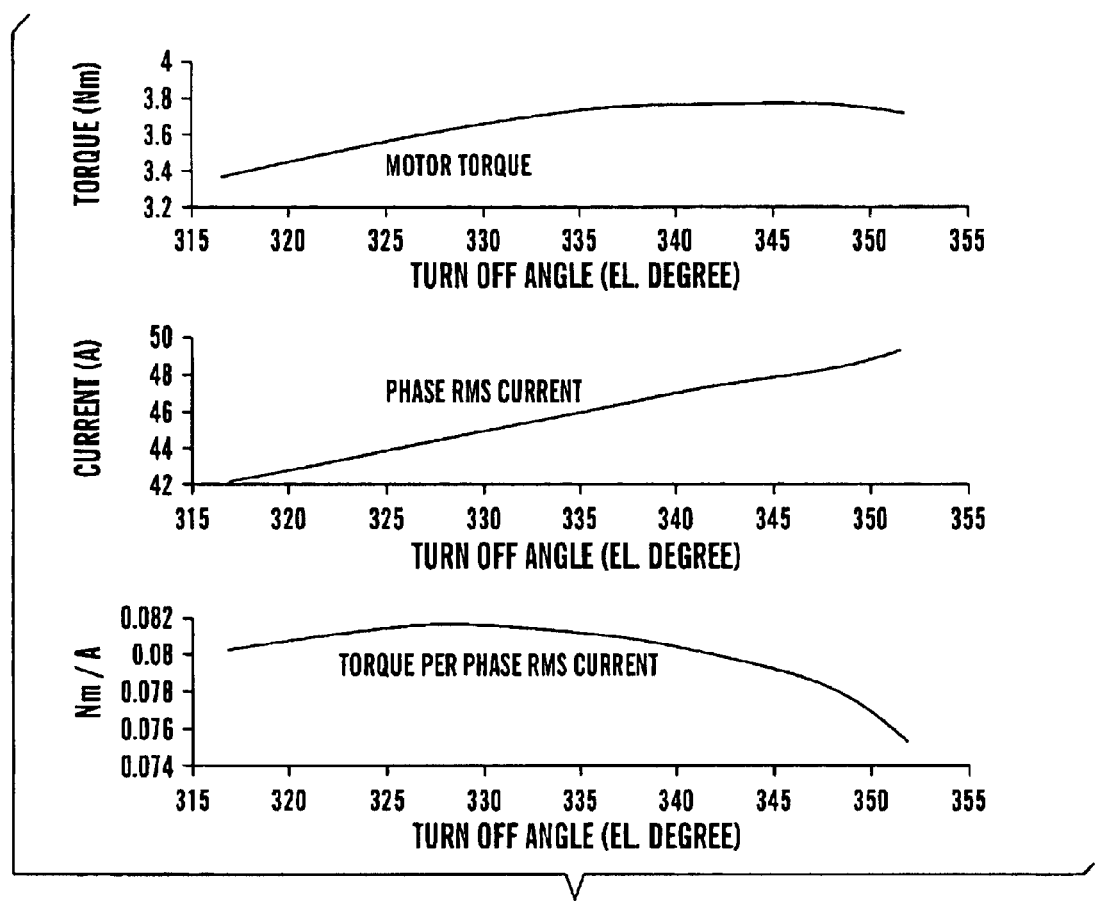
FIG. 4 depicts turn-off angle graphs for an SRM in accordance with present invention.

For a given speed, peak phase current, and turn-on angle from the turn-on controller, every possible turn-off angle can be simulated and collected in a simulation data set 32 (FIG. 1). In an exemplary embodiment, simulations are performed at every 500 rpm between 500 rpm and 3,000 rpm and every 25A between 25A and 150A. FIG. 4 shows the motor torque, phase RMS current and Tavg/Iphrms versus turn-off angle for 1000 rpm and 75A. As shown, Torque per Ampere is peaking at a turn-off angle of 333.6(electrical) degrees. Extending the turn-off angle farther produces more torque at the expense of increased RMS phase current. At this operating point, using a turn-off angle of 333.6 degrees, 3.67 Nm can be produced, which requires 44.97 A of RMS phase current. Extending the turn-off angle to 342 degrees enables 3.76 Nm to be produced, which requires 47.3 A of RMS phase current. By keeping the turn off angle at 333.6 degrees, the reference current level needs to be increased to 76.1 A to get 3.76 Nm, which requires 45.7 A RMS phase current. It can be concluded from this example that it is more efficient to increase the reference current rather than extending the turn-off angle beyond most efficient turn-off angle.

Figure 5:
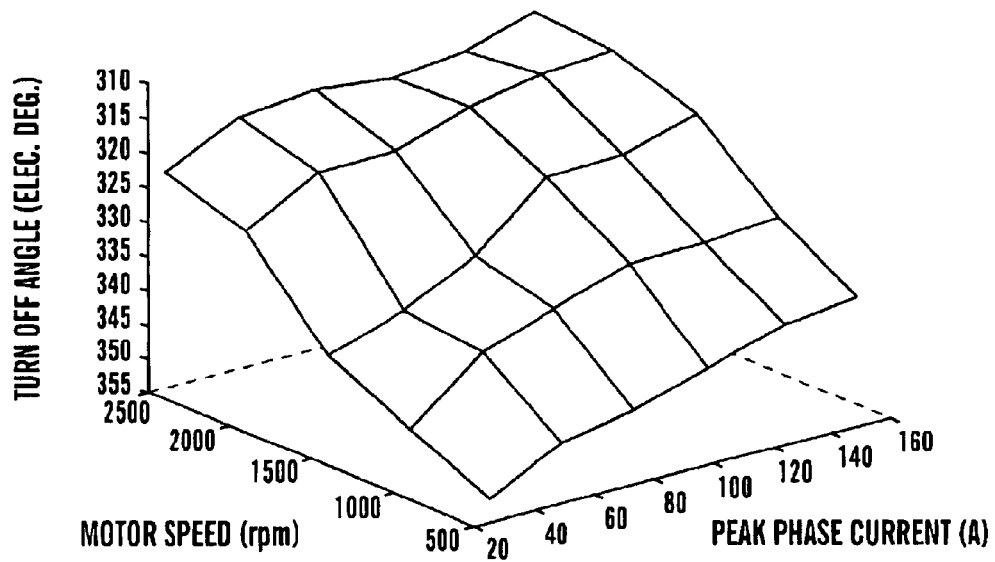
FIG. 5 depicts a three dimensional SRM performance graph in accordance with present invention.

Using the simulation data set 32, the optimum turn-off angles can be selected for a given speed and peak phase current. The goal is to then find the turn-off angle that maximizes Tavg/Iphrms for a given speed and peak phase current. FIG. 5 shows the optimal turn-off angles as a function of speed and peak phase current.

As seen, the optimum turn-off angles are a function of operating speed and peak phase current level. The optimum turn-off angles can be represented as a function of the form:

$$\theta\text{off} = k1\omega I\text{ref} + k2\omega + k3 * \text{sqrt}(I\text{ref}) + k4, \quad (2)$$

where ω is rotor speed, Iref is the reference peak phase current and k1, k2, k3 and k4 are curve fit parameters 20. For this simulation, the curve fit parameters 20 are based on a least squares fit to the collection of optimal turn-off angles over all operating points. Obviously, other curve fit methodologies could be utilized to characterize the curve fit parameters without departing from the invention. For the experimental work, the curve fit parameters 20 are based on the optimized data for four operating points representing all combinations of low speed, high speed, low current and high current.

Figure 6:
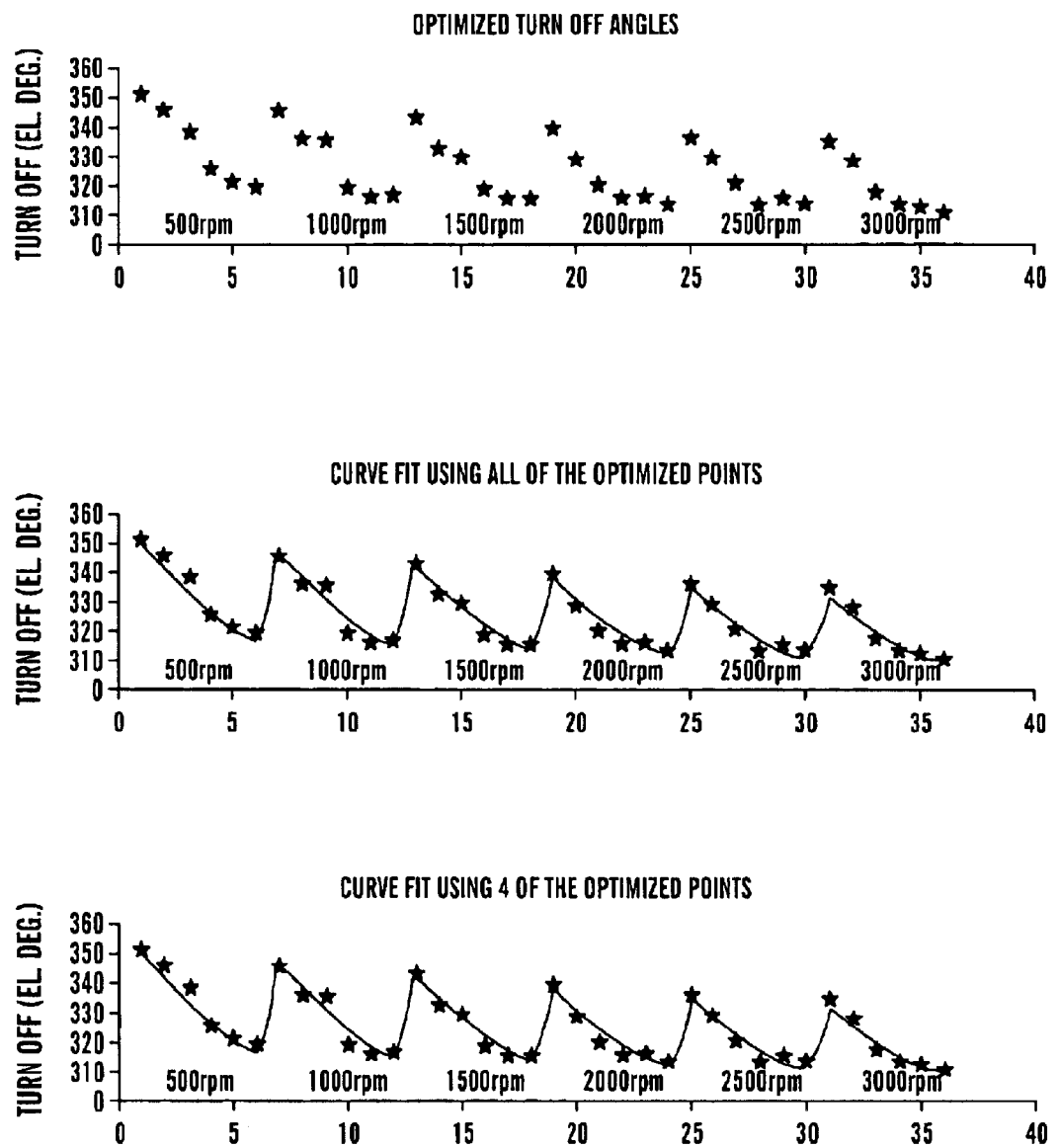
FIG. 6 depicts three different curve fit graphs in accordance with present invention.

FIG. 6 shows the curve fit of the turn-off angles using: (1) all data and (2) data from only four operating points. As seen from these graphs, the curve fit using only four data points gives results that are acceptably close to the actual optimized turn-off angles. This is quite significant because it dramatically reduces the amount of experimental data required to optimize the turn-off angle.

Figure 7:
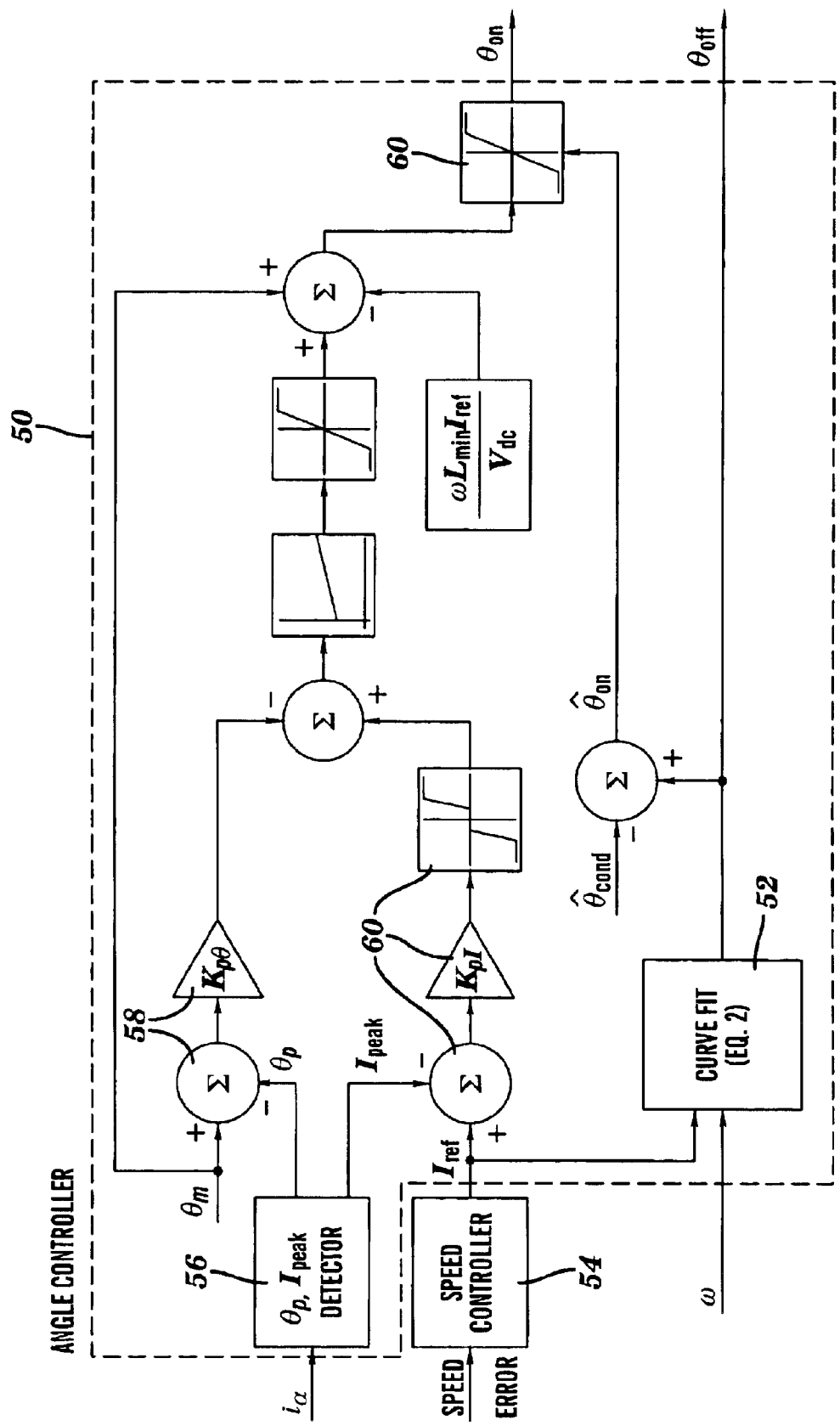
FIG. 7 depicts an angle controller in accordance with present invention.

FIG. 7 depicts a detailed overview of an integrated control system 50 for controlling θon and θoff. Control system 50 includes a detector 56 for detecting θp and Ipeak; a first system 58 that includes a summer and device $K_{p\theta}$ for providing control of the low speed component of the turn-on angle; a second system 60 for providing the high speed component of the turn-on angle; and a third system 52 for providing the turn-off angle. Also included is a limiter 60, which limits the turn-on angle, based on the calculated turn-off angle. This limitation is introduced in order to prevent the turn-on angle from being advanced to the point of allowing continuous conduction of the phase currents.

It will be appreciated through examination of FIG. 7 how the two components of the turn-on control interact to respect the commanded magnitude of phase current Iref while forcing the first peak of the phase current to occur at θm. Section 58 represents a summing junction and a gain. The summing junction determines the error in turn-on angle by subtracting θp from θm. If this difference is positive, it means that turn-on occurs too early giving Ip before θm. If this difference is negative, it means that the turn-on needs to be advanced to an earlier angle. It will be appreciated that at sufficiently high speed, θp naturally occurs θm, driving the position error to zero. This effectively turns off this section of the turn-on control. Section 60 represents a summing junction with a gain and limiting block with a dead zone. The summing junction computes the difference between the peak phase current Ipeak and the commanded peak phase current Iref. If this difference is positive, it means that the turn on angle must be advanced to an earlier angle. If this difference is negative, it means that the peak current is too large and the turn on angle must be retarded to a later angle. It will be appreciated that at low speeds a current regulator (not shown in FIG. 7) will act to force the peak phase current to be equal to the commanded phase current, driving the current error to zero. This effectively turns off this section of the turn-on control. The outputs of sections 58 and 60 are combined through a summing junction that is followed by proportional-integral controller and a limiter so that the turn-on angle does not change too rapidly. The resultant turn-on angle is the combination of θm, the combined output of the low speed and high speed sections, and an estimate of the required advance in turn-on angle. Interaction between the two sections of the turn-on controller can be appreciated by considering the situation where the motor is operating at sufficiently high speed so that the control is in voltage regulation mode. Under this scenario, the low-speed section of the turn-on controller 58 is inactive and the turn-on angle is being driven by the high speed section of the turn-on controller 60. If the speed error fed to the speed controller is forced to go negative through a reduction in the speed command, the difference between the commanded current Iref and the peak current Ipeak will go negative and will ultimately act to retard the turn-on angle to a later angle. At the same time, however, the current regulator will intervene when the phase current reaches Iref, effectively disabling the high speed section of the controller 60. If this intervention occurs at any angle other than θm, the low speed section of the controller 58 will become active pushing θon in the proper direction to realign θp with θm.

4. Verification Through Simulation

Figure 9:
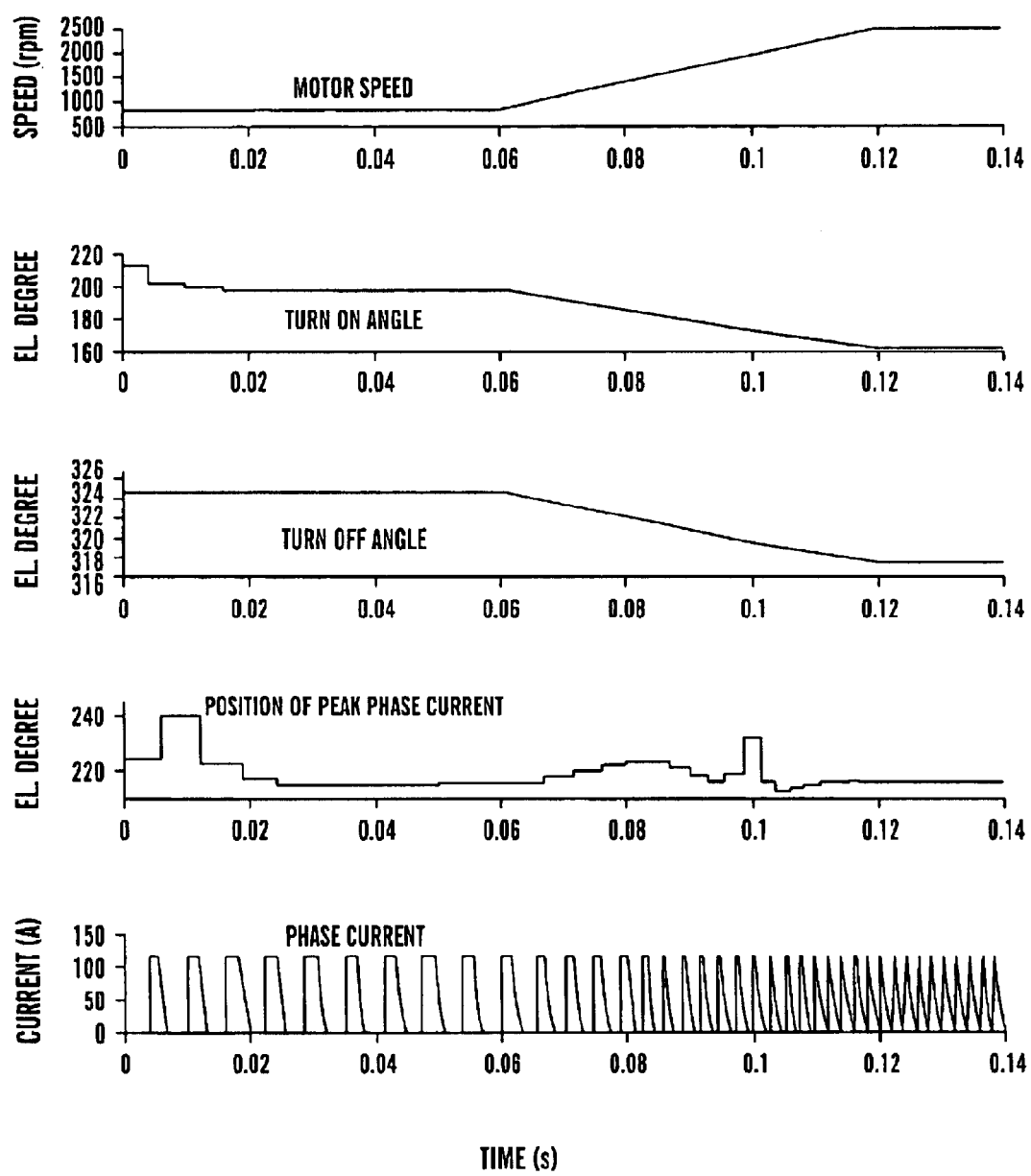
FIG. 9 depicts graphs showing the result of the angle control technique for 125A reference current and a varying speed profile.
Figure 10:
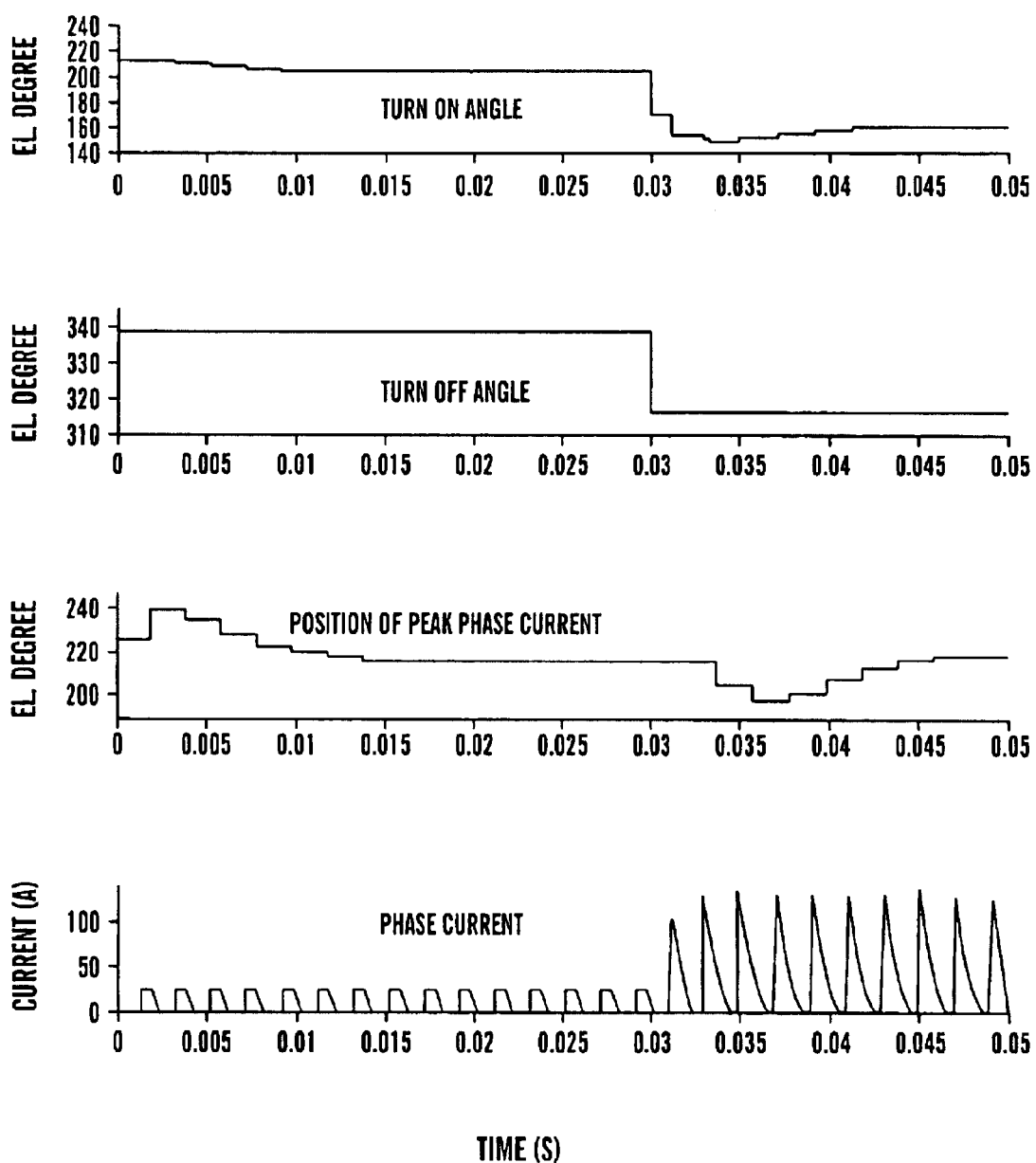
FIG. 10 shows the simulation results of the implemented control technique at 2500 rpm where the reference current is changed from 25A to 140A at 0.3 s.

The systems described above were implemented in simulation to confirm proper operation before being experimentally implemented on a physical system. The SRM to which the simulation was applied comprised a 16/12 four-phase SRM designed for a 1 kW 12 V automotive application; Table 1 shown in FIG. 8 gives the parameters of the SRM used in this work. The SRM magnetics were modeled analytically based on data collected through finite element analysis. FIG. 9 shows the result of the angle control technique for 125A reference current and a varying speed profile. FIG. 10 shows the simulation results of the implemented control technique at 2500 rpm where the reference current is changed from 25A to 140A at 0.3 s. These graphs show the turn-on controller properly placing the peak current at θm and producing the required peak current. The turn-off controller is also properly adjusting the turn-off angle for the operating speed and peak phase current level. To the extent that θon at θoff corresponds to that required for peak efficiency based on the control algorithm, the required torque is produced with the highest efficiency possible.

5. Experimental Results

FIG. 11 shows a block diagram of the experimental setup for the tests. The performance of the controller was experimentally verified through a 16/12 four-phase SRM designed for a 1 kW 12 V automotive application. The control algorithm described above was implemented using an ANALOG DEVICES® ADMC401 digital signal processor. The SRM was coupled to a hysteresis brake, which acts as a controllable mechanical load. A resolver with resolver to digital converter circuitry provided 12 bit position information to the DSP. The 12 V battery provided dc power to the inverter.

Figure 12:
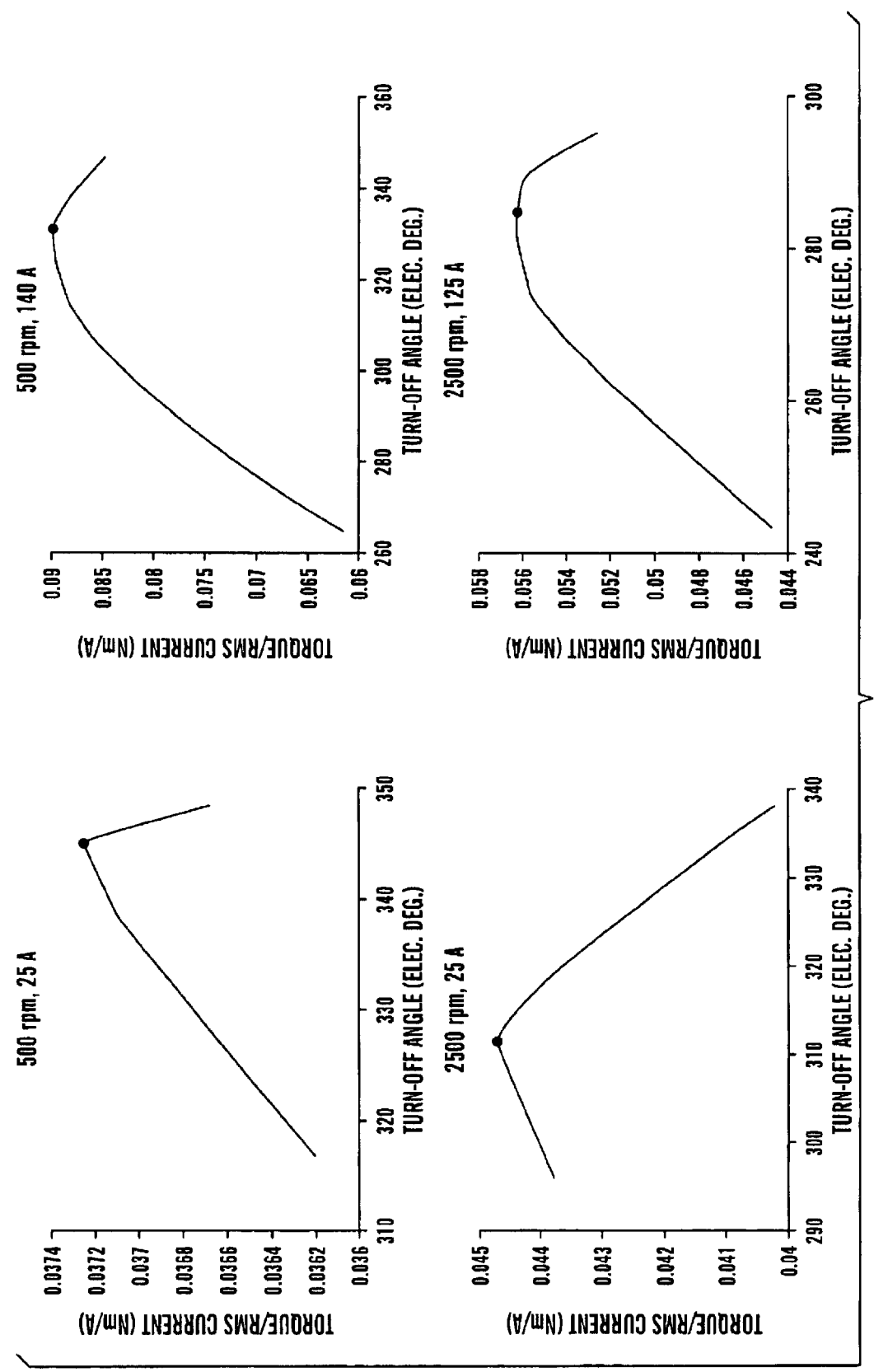
FIG. 12 shows the variation in Tavg/Iphrms with turn-off angle at four operating points.
Figure 13:
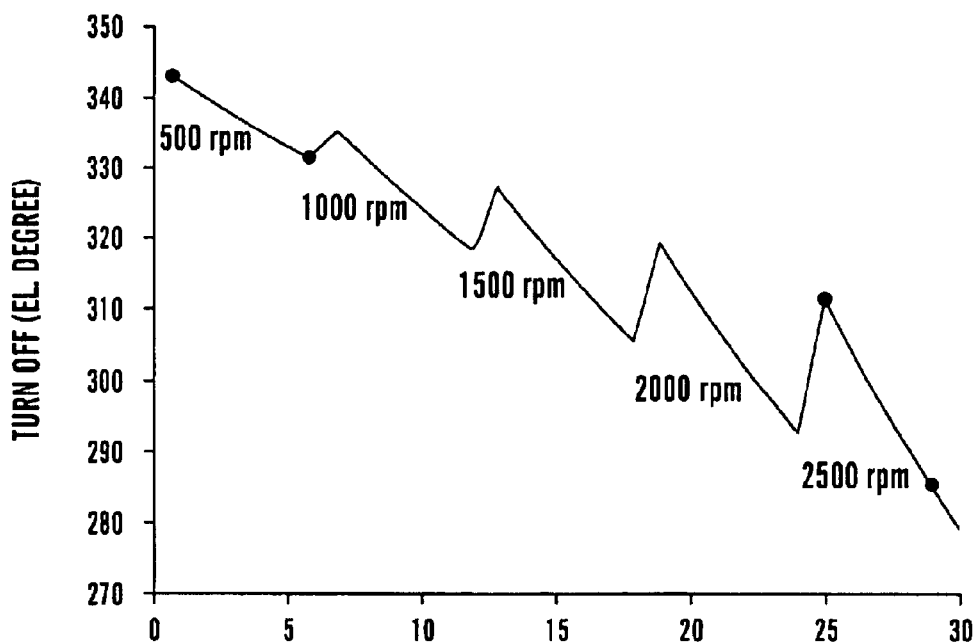
FIG. 13 shows the curve fit of the turn-off angles using the experimentally optimized data.
Figure 14:
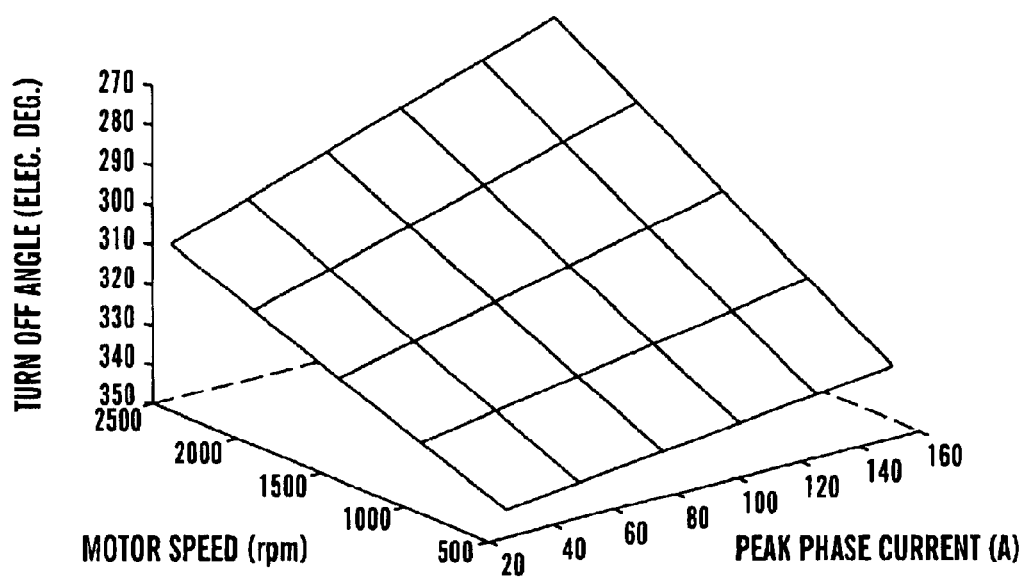
FIG. 14 shows the dependence of turn-off angle on speed and power using experimental data.

The speed controller of the SRM and proposed turn-on angle controller was implemented first. The optimization of the turn-off angle was performed at four operating points representing all combinations of low and high speed with low and high phase current. FIG. 12 shows the variation in Tavg/Iphrms with turn-off angle at four operating points. The turn-off angles of interest are those that maximize Tavg/Iphrms. Having the most efficient excitation angles for four operating points, the turn-off angles for any operating point using Eq. 2 were determined. FIG. 13 shows the curve fit of the turn-off angles using the experimentally optimized data. FIG. 14 shows the dependence of turn-off angle on speed and power using experimental data.

Figure 15:
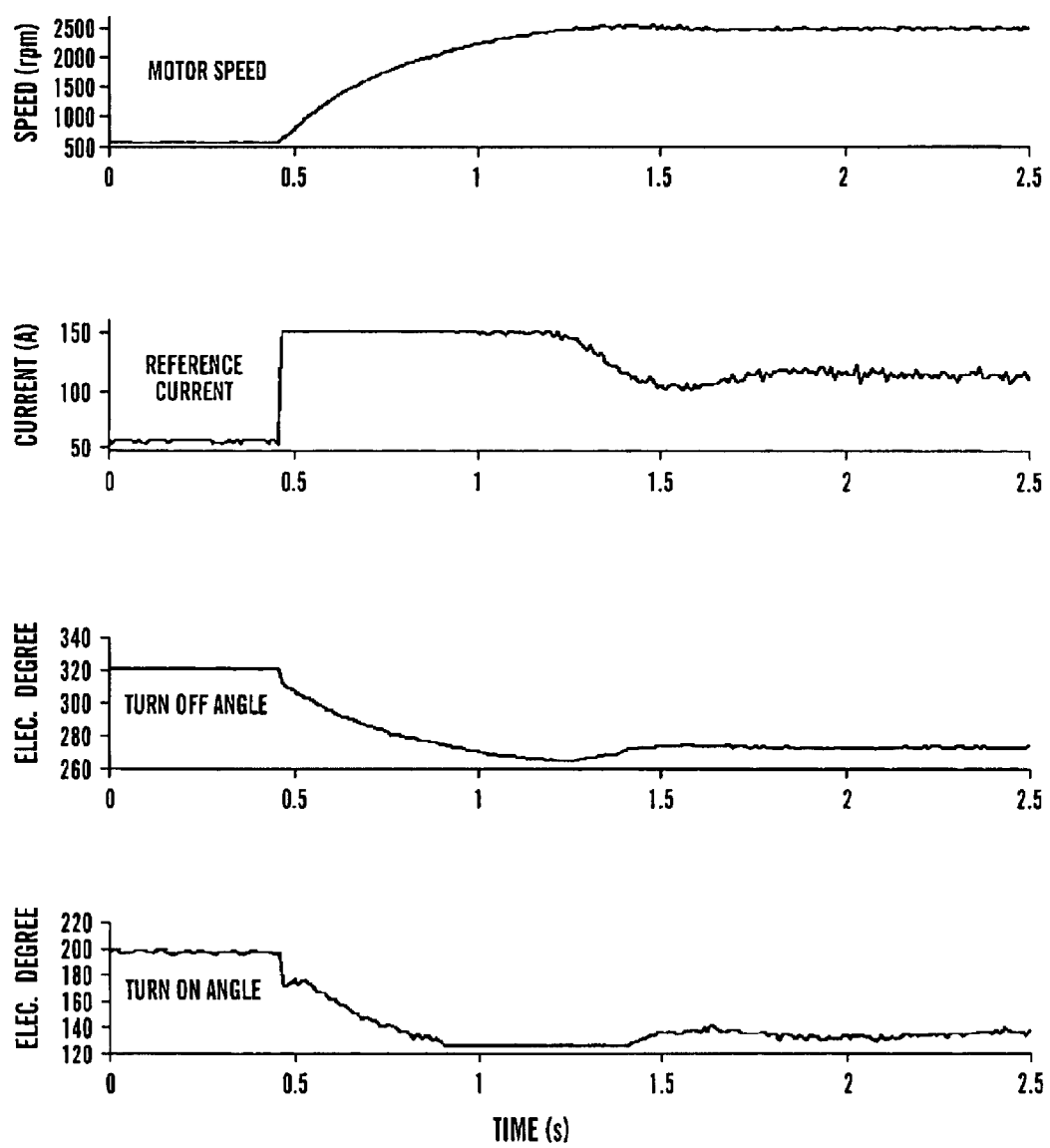
FIG. 15 shows the response of an experimental system where the speed was changed from 500 rpm to 2500 rpm with a 3nm load.
Figure 16:
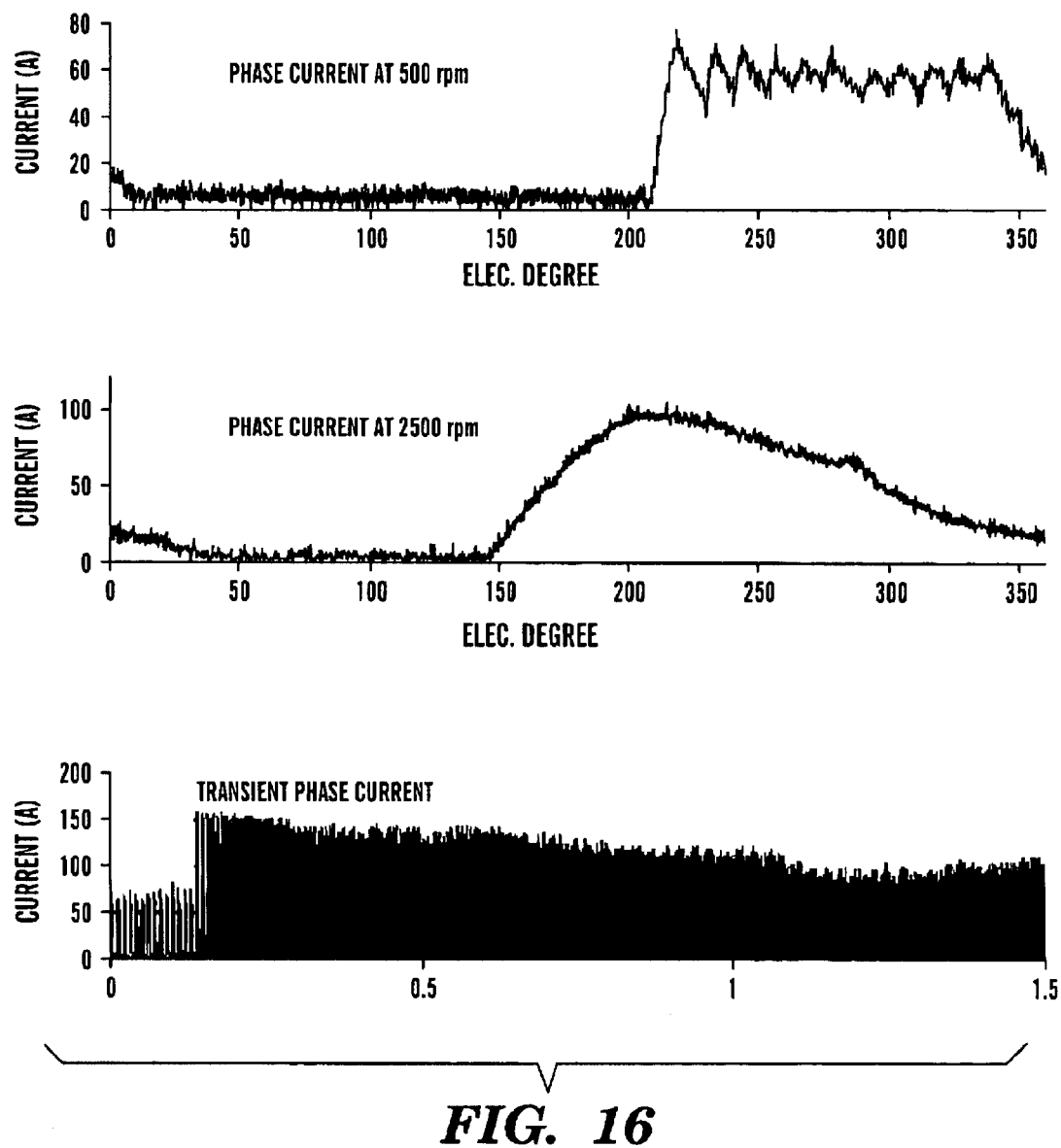
FIG. 16 shows the motor phase currents at 500 rpm, 2500 rpm and during transients.

Having the curve fit parameters 20 for the turn-off angle, the turn-off controller is integrated into the system controller. Table 2 of FIG. 8 provides the parameters used in the system controller. The complete system controller was tested in the experimental system. FIG. 15 shows the response of the experimental system where the speed was changed from 500 rpm to 2500 rpm with a 3 Nm load. FIG. 16 shows the motor phase currents at 500 rpm, 2500 rpm and during transients. The closed loop turn-on controller selectively works and make both θp=θm and Ip=Iref at each speed. The turn-off controller immediately adjusts the turn-off angle at each operating point. Both controllers work harmoniously with the speed controller to produce the desired torque with the minimum Tavg/Iphrms possible.

6. Summary

The behavior of the switched-reluctance motor efficiency is characterized in terms of operating speed, torque production and excitation angles. An efficient and easily implementable control algorithm for the excitation angles is developed. The inventive approach provides for automatic turn-on angle adjustment without the need for motor parameters or self-tuning techniques. The algorithm monitors the peak phase current and where the peak current occurs. It places the position of the first peak of phase current at θm in order to maximize Tavg/Iphrms produced by the SRM. The controller also ensures that the peak phase current is equal to the reference current. Turn-off angles are a function of peak phase current level and speed, so they can be represented through a curve fitting function. The turn-off angle is easily optimized by determining the efficiency-optimal excitation parameters at only four operating points.

The overall system and control was simulated with the SRM model based on finite element data. The control technique was implemented on an experimental system as part of an overall speed controller. The new technique provides easy implementation of the control technique. The results of these tests show that the new control technique provides an efficient SkM controller that is easy to implement.

It is understood that the'systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

What is claimed is:

1. A controller for a switch reluctance motor (SRM), comprising:
    a turn-on controller that includes a first component for controlling a turn-on angle during low speed operations and a second component for controlling the turn-on angle during high speed operations such that the two components automatically exchange control responsibility based on operating conditions; and
    a turnoff controller having an algorithm for controlling a turn-off angle, wherein the algorithm calculates the turn-off angle as a function of rotor speed, reference peak phase current, and a set of curve fit parameters.

2. The controller of claim 1, wherein the set of curve fit parameters are predetermined from a set for the SRM in which a range of optimal turn-off angles are calculated as a function of rotor speed and peak phase current, wherein the data set is selected from the group consisting of: simulated data and experimental data.

3. The controller of claim 2, wherein the curve fit parameters are predetermined based on a least squares fit calculation of the data set over the range of optimal turn-off angles.

4. The controller of claim 3, wherein the algorithm consists of four curve fit parameters.

5. The controller of claim 3, wherein the algorithm is given by formula:

$$\theta\text{off}=k1\omega I\text{ref}+k2\omega+k3*\text{sqrt}(I\text{ref})+k4,$$

where $\omega$ is rotor speed, Iref is the reference current and k1, k2, k3 and k4 are the set of curve fit parameters.

6. The controller of claim 5, wherein the first component of the turn-on controller causes a rotor angle position associated with a first peak of the phase current to equal the rotor angle position where an inductance begins to increase.

7. The controller of claim 5, wherein the second component of the turn-on controller cause the turn-on angle to be advanced until peak current equals the reference peak phase current.

8. The controller of claim 1, wherein the turn-on controller includes a limiter for limiting the turn-on angle based on the turn-off angle.

9. A system for controlling a turn-off angle for a switch reluctance motor (SRM), comprising an algorithm that calculates the turn-off angle as a function of rotor speed, reference peak phase current, and a set of curve fit parameters.

10. The system of claim 9, wherein the set of curve fit parameters are predetermined from a data set for the SRM in which a range of optimal turn-off angles are calculated as a function of rotor speed and reference peak phase current, wherein the data set is selected from the group consisting of: simulated data and experimental data.

11. The system of claim 10, wherein the curve fit parameters are predetermined based on a least squares fit calculation of the data set over the range of optimal turn-off angles.

12. The system of claim 11, wherein algorithm consists of four curve fit parameters.

13. The system of claim 12, wherein the algorithm is given by formula:

$$\theta\text{off}=k1\omega I\text{ref}+k2\omega+k3*\text{sqrt}(I\text{ref})+k4,$$

where $\omega$ is rotor speed, Iref is the reference current and k1, k2, k3 and k4 are the set of curve fit parameters.

14. The system of claim 9, wherein the calculated turn-off angle is provided to a turn-on controller in order to provide a limit to a turn-on angle.

15. A program product stored on a recordable medium for controlling a switch reluctance motor (SRM), the program product comprising:
    means for controlling a turn-on angle during low speed operations;
    means for controlling the turn-on angle during high speed operations;
    means for automatically transitioning between low speed and high speed operations based on operating conditions; and
    means for controlling a turn-off angle, wherein said means includes an algorithm that calculates the turn-off angle as a function of rotor speed, reference peak phase current, and a set of curve fit parameters.

16. The program product of claim 15, wherein the set of curve fit parameters are predetermined from a data set for the SRM in which a range of optimal turn-off angles are calculated as a function of rotor speed and reference peak phase current, wherein the data set comprises either simulated or experimental data.

17. The program product of claim 16, wherein the curve fit parameters are predetermined based on a least squares fit calculation of the data set over the range of optimal turn-off angles.

18. The program product of claim 17, wherein the algorithm is given by formula:

$$\theta\text{off}=k1\omega I\text{ref}+k2\omega+k3*\text{sqrt}(I\text{ref})+k4,$$

where $\omega$ is rotor speed, Iref is the reference current and k1, k2, k3 and k4 are the set of the set of curve fit parameters.

19. The program product of claim 15, wherein means for controlling a turn-on angle during low speed operation causes a rotor angle position associated with a first peak of the phrase current to equal the rotor angle position where an inductance begins to increase.

20. The program product of claim 15, wherein the means for controlling the turn-on angle during high speed operation causes the turn-on angle to be advanced until peak current equals the reference peak phase current.

21. A switch reluctance motor (SRM) controller, comprising:
    a first system for controlling a turn-on angle when the SRM operates below a base speed, wherein said first system causes a rotor angle position associated with a first peak of the phase current to equal the rotor angle position where an inductance begins to increase;
    a second system for controlling the turn-on angle when the SRM operates above a base speed, wherein said second system causes the turn-on angle to be advanced until peak current equals a reference current;
    a third system for automatically transitioning between operation at low speed and high speed; and
    a fourth system for controlling a turn-off angle, wherein said fourth system includes the algorithm that calculates the turn-off angle as a function of rotor speed, reference peak phase current, and a set of pre-calculated curve fit parameters.

22. The SRM controller of claim 21, wherein the algorithm is given by formula:

$$\theta\text{off}=k1\omega I\text{ref}+k2\omega+k3 I\text{ref}+k4,$$

where $\omega$ is rotor speed, Iref is the reference peak phase current and k1, k2, k3 and k4 are the set of pre-calculated curve fit parameters.

23. A method for controlling a turn-off angle for a switch reluctance motor (SRM), comprising the steps of:
    obtaining a reference current value from a speed controller of the SRM;
    obtaining a rotor speed of the SRM; and
    calculating the turn-off angle as a function of rotor speed, reference peak phase current, and a set of pre-calculated curve fit parameters.

24. The method of claim 23, wherein the set of curve fit parameters are pre-calculated from a simulated or experimental data set for the SRM in which a range of optimal turn-off angles are calculated as a function of rotor speed and peak phase current.

25. The method of claim 24, wherein the curve fit parameters are calculated based on a least squares fit calculation of the simulated data set over the range of optimal turn-off angles.

26. The method of claim 25, wherein the turn-off angle $\theta$off is given by formula:

$$\theta\text{off}=k1\omega I\text{ref}+k2\omega+k3*\text{sqrt}(I\text{ref})+k4,$$

where $\omega$ is rotor speed, Iref is the reference peak phase current and k1, k2, k3 and k4 are the set of curve fit parameters.

* * * * *

UNITED STATES PATENT AND TRADEMARK OFFICE
CERTIFICATE OF CORRECTION

PATENT NO. : 6,864,658 B1
DATED : March 8, 2005
INVENTOR(S) : Torrey et al.

It is certified that error appears in the above-identified patent and that said Letters Patent is hereby corrected as shown below:

Column 3,
Line 67, delete "3nm" and insert -- 3Nm --

Column 11,
Line 14, insert -- s -- after the word "cause"

Column 12,
Line 5, insert -- peak phase-- after the word "reference"
Line 6, delete the second "the set of"
Line 10, delete "phrase" and insert -- phase --
Line 30, delete "fourth" and insert -- third --

Signed and Sealed this

Tenth Day of May, 2005

JON W. DUDAS
*Director of the United States Patent and Trademark Office*